(12) United States Patent
Crawford et al.

(10) Patent No.: US 7,475,767 B2
(45) Date of Patent: Jan. 13, 2009

(54) VIBRATORY SYSTEM FOR DISTRIBUTING ARTICLES

(75) Inventors: Steve Crawford, Walla Walla, WA (US); William L. Davis, Jr., Burbank, WA (US)

(73) Assignee: Key Technology, Inc., Walla Walla, WA (US)

( * ) Notice: Subject to any disclaimer, the term of this patent is extended or adjusted under 35 U.S.C. 154(b) by 103 days.

(21) Appl. No.: 11/710,194

(22) Filed: Feb. 22, 2007

(65) Prior Publication Data

US 2008/0202891 A1 Aug. 28, 2008

(51) Int. Cl.
*B65G 47/10* (2006.01)
(52) U.S. Cl. .................... 198/369.7; 198/752.1
(58) Field of Classification Search .......... 198/360, 198/369.7, 752.1–772
See application file for complete search history.

(56) References Cited

U.S. PATENT DOCUMENTS

| | | | |
|---|---|---|---|
| 1,345,858 A | 7/1920 | Jenkins | |
| 3,043,420 A | 7/1962 | Kelly | |
| 3,570,666 A | 3/1971 | Delcellier | |
| 3,731,787 A | 5/1973 | Gregor | |
| 4,313,535 A | 2/1982 | Carmichael | |
| 5,555,967 A | 9/1996 | Hufford | |
| 6,193,050 B1 * | 2/2001 | Svejkovsky et al. | 198/347.2 |
| 6,378,688 B1 | 4/2002 | Fitzgerald et al. | |
| 6,691,853 B1 * | 2/2004 | Basketfield | 198/360 |
| 6,705,458 B2 * | 3/2004 | Thompson et al. | 198/752.1 |
| 6,945,382 B2 | 9/2005 | Harstad et al. | |
| 2003/0127302 A1 | 7/2003 | Brewer | |

OTHER PUBLICATIONS

Al-Dakkan, Khalid A.; Dynamic Constraint Based Energy Saving Control of Pneumatic Servo Systems, ASME Journal of Dynamic Systems, Measurement and Control, Dec. 18, 2003.

* cited by examiner

*Primary Examiner*—Mark A Deuble
(74) *Attorney, Agent, or Firm*—Mark A. Bauman (57) ABSTRACT

The present invention is a vibratory distribution system which utilizes a metering gate assembly useful for selectively passing and diverting articles from a stream of articles to either or both a downstream conveyor or a cross conveyor. The metering gate assembly is capable of providing a proportional distribution in response to a user specified control point. The metering gate assembly includes an actuator that is borne by the conveyor bed, and a control valve that is operable to hold a slide gate in a desired position despite the violent vibratory motion imparted by the conveyor bed.

19 Claims, 6 Drawing Sheets

VIBRATORY SYSTEM FOR DISTRIBUTING ARTICLES

TECHNICAL FIELD

The present invention relates in general to a system for distributing or metering articles from a moving stream of articles, and particularly a system for distributing or metering an adjustable portion of the articles from the stream.

BACKGROUND OF THE INVENTION

The prior art is replete with scores of patents which describe various vibratory conveyor systems which are utilized to convey a product along a course of travel for various purposes.

These vibratory conveying systems, as exemplified in U.S. Pat. No. 4,313,535, and incorporated by reference herein, have traditionally been utilized for transporting a stream of articles from one point to another in a production line. Such vibratory conveying systems have found acceptance in many industries, and have received exemplary acceptance in the food production industries. This acceptance in the food industry is understandable given the reputation of superior sanitation afforded by vibratory conveying systems over alternative conveying technologies.

An important application of vibratory conveying systems includes the combination of transport and distribution of articles from a single incoming product stream to multiple product streams. In this application, the vibratory conveying systems include metering stations or gate assemblies that are integrated into the vibratory conveyor at points along the length of the conveyor to selectively divert or transport all or a portion of the stream of articles from the vibratory conveyor to a downstream conveyor, chute, or another machine. This transfer of the articles is most often accomplished by virtue of gravity. The metering stations or gate assemblies may be operated by either manual or powered means, and may be controlled manually or automatically. Most manual metering stations are operated in a transverse manner by movement of a slide or gate plate to selectively cover apertures formed in the pan or trough of the vibratory conveyor. Most automatic gate stations are operated in a longitudinal manner to selectively cover apertures formed in the bed of the vibratory conveyor.

Many automatic or powered gate stations found in the market today operate exclusively in one of two discrete positions—either fully open or fully closed. An example of such a gate station is shown in U.S. Pat. No. 6,945,382 and incorporated by reference herein.

For many years, several automatic metering stations have been available that are capable of selecting a portion of the stream of articles by selectively blinding a portion of the aperture formed in the bed over a range between the fully opened and fully closed positions. One exemplary example of this type of metering station is the transverse metering station found in U.S. Pat. No. 5,555,967 and incorporated by reference herein. This metering station provides a slide plate that is selectively movable in a transverse direction past a plurality of apertures to proportion or meter articles from a product stream. In this case, the slide plate is movable by a motorized actuator mounted on the quasi-stationary member of the vibratory conveyor, in this case the frame of the vibratory conveyor, and connected via a linkage.

The motorized actuators used in proportioning or metering gates in much of the prior art are mounted to the frame of the vibratory conveyor and coupled to the slide plate by a linkage. This frame mounting arrangement and linkage serves to isolate the motorized actuator from the violent vibrations that would be experienced if the motorized actuator was mounted to the bed of the vibratory conveyor. However, such linkage arrangements introduce additional problems including inaccuracy, backlash, linkage failure, and sanitation problems.

In addition, the motorized actuators themselves require a rotational to linear converter which often takes the form of a lead screw of suitable length to provide for movement of the slide plate to cover the extent of distance needed to open and close the gate. Such lead screws require maintenance and are similarly prone to introducing sanitation problems which are especially problematic in food production environments.

So, what is needed is a vibratory system for distributing articles or a vibratory distribution system that is a robust and sanitary metering or proportioning gate or metering station that installed in a vibratory conveyor that is able to accurately divert or distribute articles in a controlled ratio and manner. These and other objects and advantages of the present invention will become apparent upon careful consideration of the following description of the invention.

SUMMARY OF THE INVENTION

A first aspect of the present invention is to provide a vibratory distribution system for receiving a stream of articles and conveying articles for selectively metering and diverting articles from the stream. The system includes an elongated conveyor bed for receiving and conveying the articles, a vibratory drive operatively connected to the conveyor bed for vibrating the conveyor bed to convey the articles in the stream, and a metering gate assembly configured to selectively meter and divert articles from the stream. The metering gate assembly includes an aperture formed in the conveyor bed and positioned in receiving relation to the articles, a slide plate positioned in contact and sliding relation to the conveyor bed and located proximate to the aperture, an actuator with a piston rod, and first and second fluid ports positioned in force transmission relation to the slide plate, a control valve connected in fluid communication with the first and second fluid ports of the actuator; and wherein the control valve is configured to direct a flow of fluid to either the first or second fluid ports of the actuator to translate the piston rod of the actuator, and is further configured to block a flow of fluid from both the first and second fluid ports of the actuator to maintain a position of the piston rod of the actuator.

Another aspect of the present invention is to provide a vibratory distribution system for receiving a stream of articles and conveying articles for selectively metering and diverting articles from the stream. The system includes an elongated conveyor bed for receiving and conveying the articles, a vibratory drive operatively connected to the conveyor bed for vibrating the conveyor bed to convey the articles in the stream, and a metering gate assembly configured to selectively meter and divert articles from the stream. The metering gate assembly includes an aperture formed in the conveyor bed and positioned in receiving relation to the articles, a slide plate positioned in contact and sliding relation to the conveyor bed and located proximate to the aperture, an actuator borne by the conveyor bed and positioned in force transmission relation to the slide plate a position sensor configured to provide a position signal indicative of the relative position of the slide plate to the aperture, and a control system responsive to a user specified set point and configured to compare the user specified set point with the signal from the position sensor and configured to modulate the actuator to translate the slide plate to a position that is substantially equal to a user specified set point.

Still further, another aspect of the present invention is to provide a vibratory distribution system for receiving a stream of articles and conveying articles for selectively metering and diverting articles from the stream. The vibratory distribution system includes an elongated conveyor bed for receiving and conveying the articles, a vibratory drive operatively connected to the conveyor bed for vibrating the conveyor bed to convey the articles in the stream, and a metering gate assembly configured to selectively meter and divert articles from the stream. The metering gate assembly comprises an aperture formed in the conveyor bed and positioned in receiving relation to the bulk articles, a slide plate having a non-rectangular and planar shape, and positioned in contact and sliding relation to the conveyor bed and located proximate to the aperture, an actuator borne by the conveyor bed and positioned in force transmission relation to the slide plate and operable to position the slide plate at a plurality of specific points through a substantially continuous distance, and wherein the continuous distance includes two end positions such that in a first end position the slide plate is positioned in article blocking relation relative to the aperture, and in a second end position the slide plate is positioned in article transmission relative to the aperture, and wherein the slide plate is selectively positionable at any one of the plurality of specific points to selectively divert a portion of the article stream from the stream of articles, and wherein the ratiometric volume is an approximate function of the position of the slide plate relative to the vibratory conveyor.

These and other aspects of the present invention will be discussed in greater detail hereinafter.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
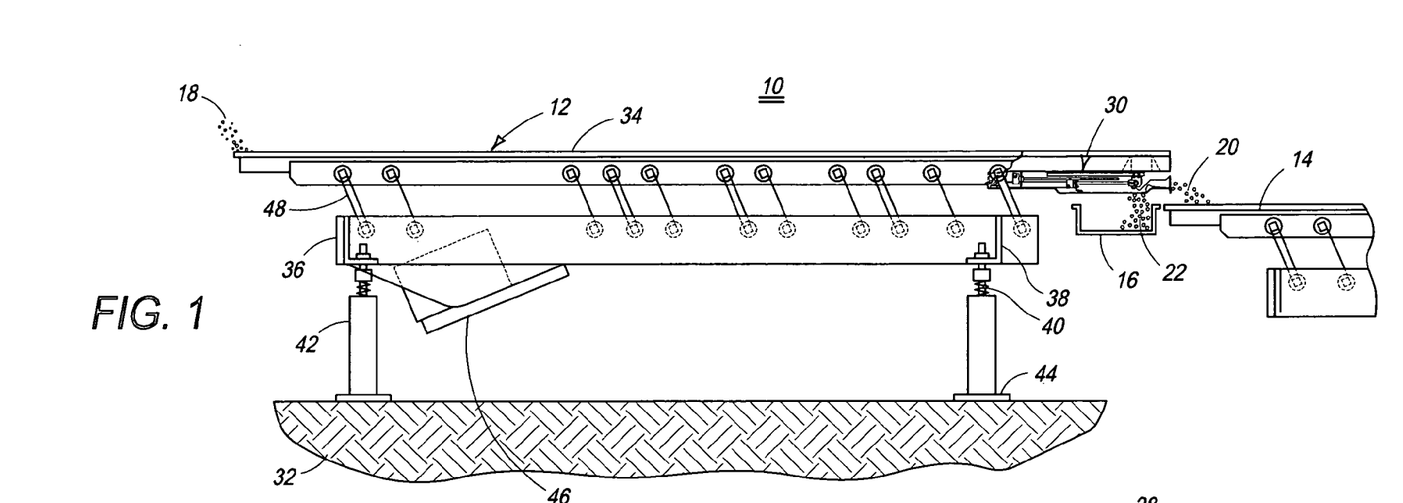
FIG. 1 is an elevation view of an embodiment of the vibratory distribution system which also illustrates an example relationship of the system to mating equipment with the slide plate shown in an intermediate position between an open and closed position relative to the aperture and the vibratory conveyor.
Figure 2:
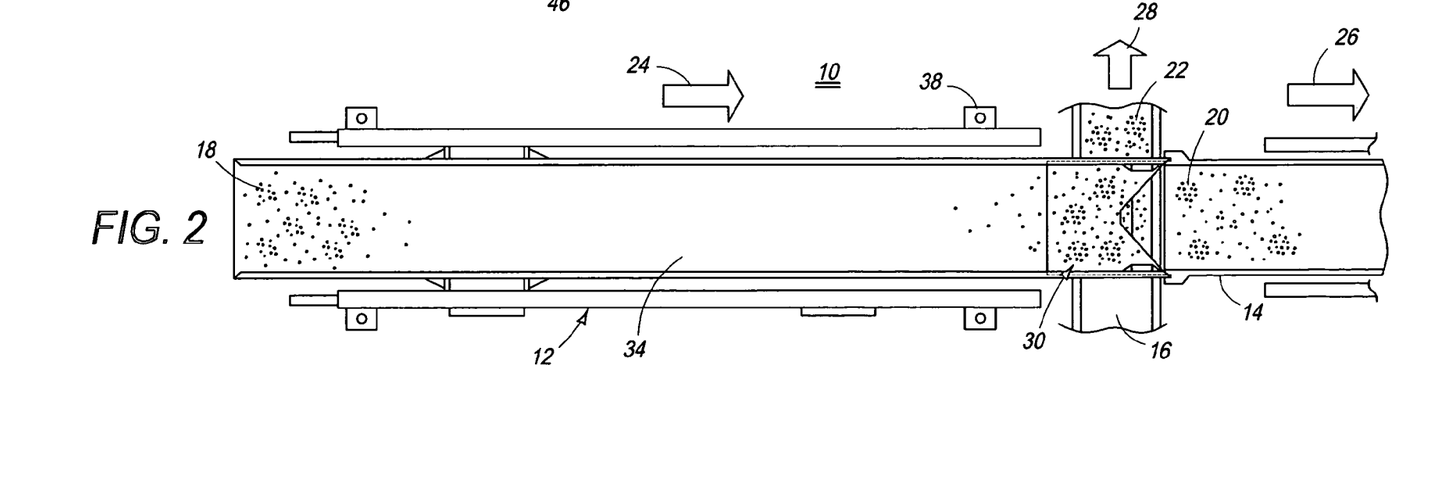
FIG. 2 is a plan view of an embodiment of the vibratory distribution system which also illustrates an example relationship of the system to mating equipment with the slide plate shown in an intermediate position between an open and closed position relative to the aperture and the vibratory conveyor.

A preferred vibratory distribution system is illustrated in FIGS. 1 and 2 and is identified generally with the numeral 10. The vibratory distribution system 10 receives a stream of articles 18 at its infeed end and conveys the articles along its length to a metering gate assembly 30 which meters or proportions the articles in volumetric fashion to either a downstream vibratory conveyor 14 or to a cross conveyor 16. The downstream vibratory conveyor 14 receives the articles selected or metered from the stream of articles 18 as a conveyor discharge or pass stream 20 in a direction indicated by an arrow 26. Articles that drop through the metering gate assembly 30 into the cross conveyor 16 travel in a direction as indicated by an arrow 28, forming a gate discharge or cross stream 22. The cross stream 22 may be delivered to a packaging machined or a weighing apparatus. The configuration of the metering gate assembly 30 determines the relative proportion of articles from the stream of articles 18 that are distributed between the conveyor discharge or pass stream 20 and the gate discharge or cross stream 22 as will be discussed in more detail below.

The vibratory conveyor 12 is configured to transport the articles in a manner that is well-known in the art. For example, the vibratory conveyor 12 may be of a frame driven or bed driven type, and may further be driven using electromagnetic, eccentric, or other type of vibratory drive. The motion in the vibratory conveyor 12 may be elliptical, horizontal, or a combination of the two. The vibratory conveyor 12 shown in FIGS. 1 and 2 is a frame driven isolated vibratory conveyor having the conveyor bed or pan selected to convey the stream of articles 18 in a direction generally indicated by the arrow 24. The vibratory conveyor 12 is supported on a platform or floor 32, resting on a plurality of plates 44 which are grouted to the floor 32. A plurality of columns 42 are mounted to the plates 44. Each of the plurality of columns 42 retain an isolation spring 40 which effectively reduces the amount of transmitted vibration from the vibratory conveyor 12 to the floor 32. The isolation springs 40 are connected to a plurality of frame brackets 38 that are welded to a frame 36 of the vibratory conveyor 12. A vibratory drive 46 is connected to the frame 36 and is selected to provide a linear oscillating force to drive the articles in the stream of articles 18 the length of the elongated conveyor bed 34. The frame 36 supports a plurality of spring arms 48 which are fastened along the length of the vibratory conveyor 12 between the frame 36 and the conveyor bed 34. The frame 36 in this configuration is mounted below the conveyor bed 34. However, in distribution applications, it is often advantageous to position the frame of 36 so it resides above the conveyor bed 34 so that articles from the stream of articles 18 that are discharged through the metering gate assembly 30 can pass more directly to the cross conveyor 16.

The spring arms 48 are resilient, and form a spring and mass system that are excited to produce vibratory conveying motion which is effective at moving the articles along the conveyor bed 34. The vibratory motion created by the vibratory conveyor 12 is effective at conveying articles in the stream of articles 18 but also provides high levels of vibration and acceleration which must be endured by components that are affixed to the conveyor bed 34.

Figure 3:
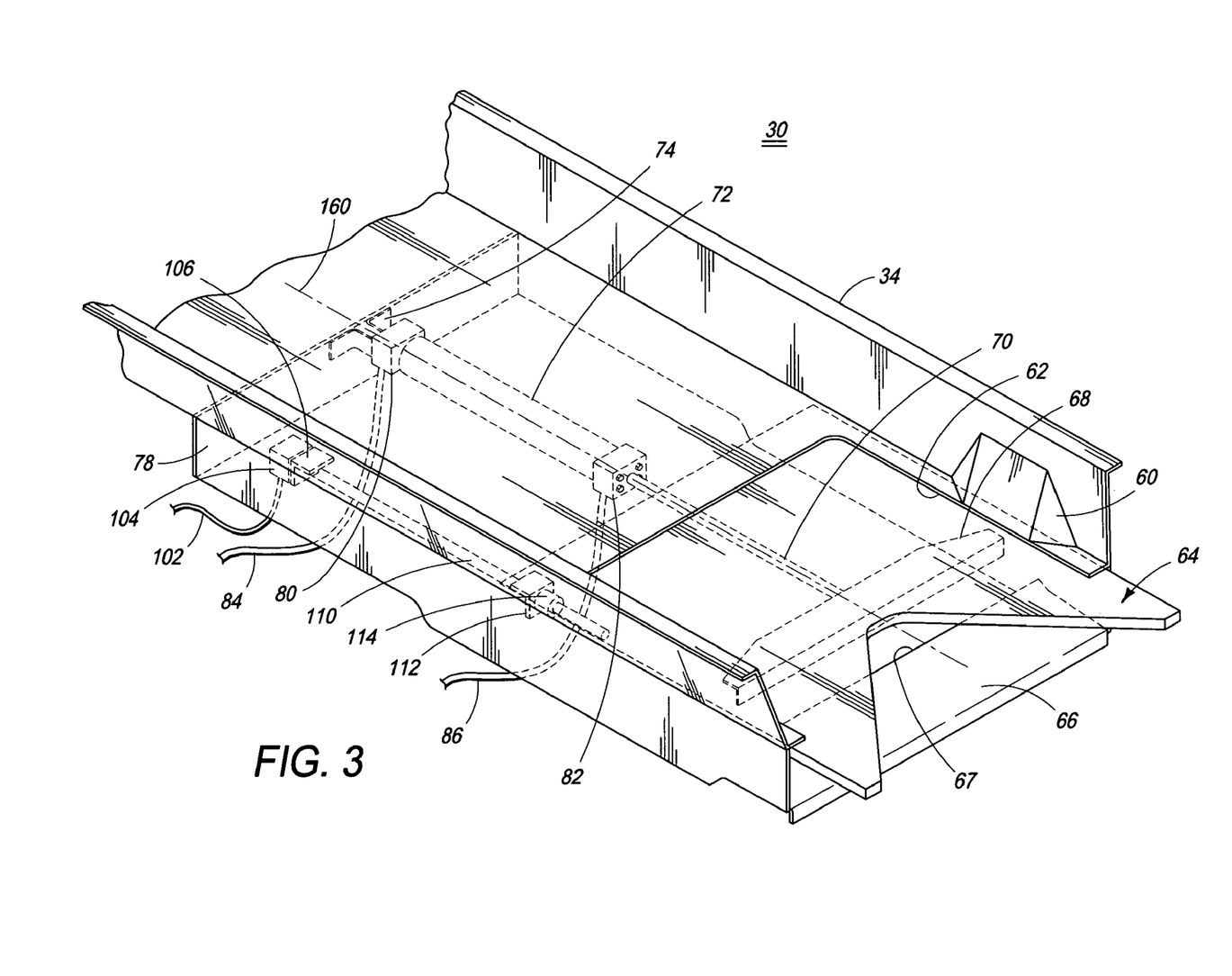
FIG. 3 is an isometric view of the vibratory conveyor bed and a portion of the components of the metering gate assembly with the slide plate shown in a closed position relative to the aperture and the vibratory conveyor.
Figure 4:
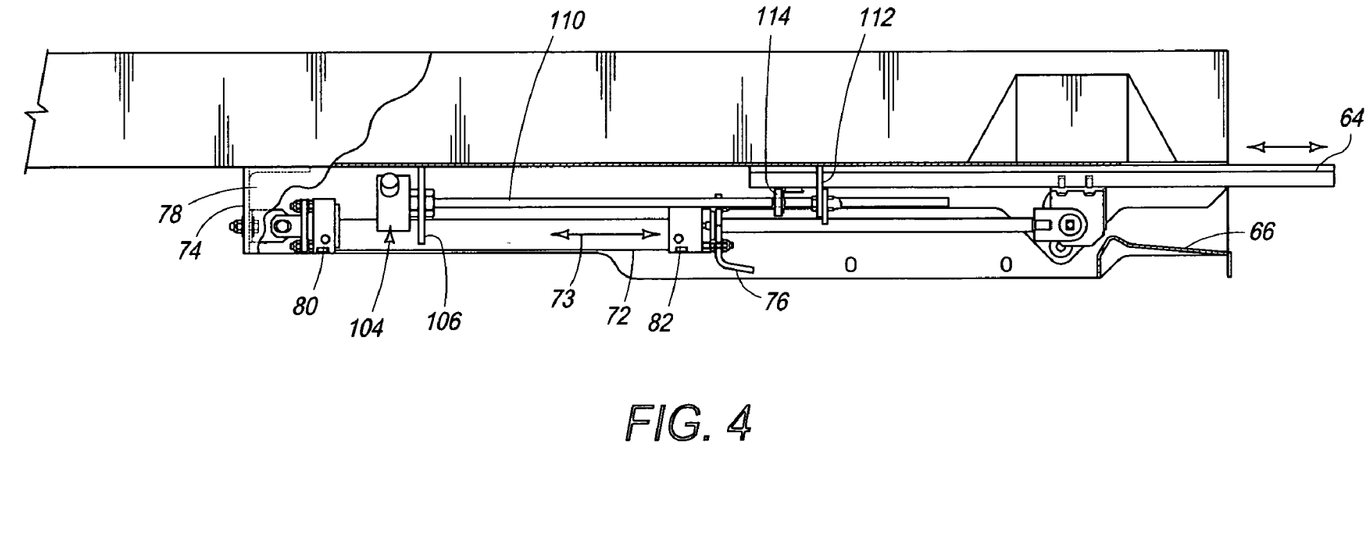
FIG. 4 is a fragmentary elevation view of the vibratory conveyor bed and a portion of the components of the metering gate assembly with the slide plate shown in a closed position relative to the aperture and the vibratory conveyor.

Referring now to FIGS. 3 and 4, a portion of the metering gate assembly 30 is shown in a fully extended position, and is located at a discharge end of the vibratory conveyor 12. The metering gate assembly 30 may be positioned at other locations along the length of the vibratory conveyor 12, or alternatively may be positioned in side-by-side relation along the width of the vibratory conveyor 12. The metering gate assembly 30 includes an aperture 62 formed into the conveyor bed 34. In FIG. 3, the aperture 62 shown has three edges formed directly into the conveyor bed 34.

A drop plate 66 is borne by the conveyor bed 34, and is positioned near an end of the aperture 62. A leading edge of the drop plate 66 forms an effective aperture edge 67 when the metering gate assembly 30 is positioned as shown on the vibratory conveyor 12.

In another embodiment, the metering gate assembly 30 is positioned at an intermediate position along the length of the vibratory conveyor 12, and the effective aperture edge 67 is formed by a conveying surface (not shown) positioned in similar relation to the drop plate 66, and extending along the length of the vibratory conveyor 12.

In yet another embodiment, the effective aperture edge 67 is formed by an infeed end of the downstream vibratory conveyor 14. The drop plate 66 is positioned in receiving relation to articles that are to be distributed to the downstream vibratory conveyor 14 (FIG. 2). The drop plate 66 may be oriented in a forward sloping arrangement to assist conveying articles on their course of travel to the downstream vibratory conveyor 14 (FIG. 2). The size of the drop plate 66 is selected so the articles will be conveyed to the downstream vibratory conveyor 14 (FIG. 2) when a slide plate 64 is in its fully extended or closed position, and will not contact articles when the slide plate 64 is in its fully retracted or open position.

A pair of edge diverters 60 are positioned proximate to the aperture 62 and are welded to the conveyor bed 34. The diverters 60 are arranged to urge articles from the stream of articles 18 to interact with the gate assembly 30 rather than bypass around the perimeter of the aperture 62.

The slide plate 64 is positioned in sliding relation to the conveyor bed 34, and is positioned proximate to the aperture 62. In the embodiment shown, the slide plate 64 has a non-rectangular shape and is symmetrical about a longitudinal axis 160 of the conveyor bed 34. The shape of the slide plate 64 may include other geometries which will be discussed in further detail below. The slide plate 64 is borne by the conveyor bed 34 by a pair of slide rails (not shown) that are positioned in contact and sliding relation to the slide plate 64. The slide plate 64 is composed of a plastic material such as UHMW which provides for self lubricating contact with the conveyor bed 34 to facilitate its movement or translation relative to the aperture 62. The slide plate 64 has an article contacting surface 130 (FIG. 6) and an actuator side surface 162 which will be discussed in more detail below. The surface area of the article contacting surface 130 should be greater than the surface area enclosed by the aperture 62 so that the metering gate assembly 30 will transmit all of the articles from the stream of articles 18 (FIG. 2) to the conveyor discharge stream 20 (FIG. 2) when it is in its fully extended or closed position.

A plate bracket 68 is fastened to the actuator side surface 162 (FIG. 6) of the slide plate 64. The plate bracket 68 extends transversely across the width of the slide plate 64.

A gate assembly support weldment 78 is welded to an underside of the conveyor bed 34 and serves to hold the mechanical elements of the gate assembly to the conveyor bed 34. The plate bracket 68 is welded to the gate assembly support weldment 78.

An actuator base support bracket 74 is welded to the gate assembly support weldment 78. An actuator head support bracket 76 is welded to the gate assembly support weldment 78.

An actuator 72 is borne by the conveyor bed 34 and connected in force transmission relation to the plate bracket 68. The plate bracket 68 serves to distribute and transmit force generated by the actuator 72 to the slide plate 64 to cause the slide plate 64 to move within a range of positions bounded by a fully retracted or open position and a fully extended or closed position. Force generated by the actuator 72 has a direction that is generally indicated by the arrow 73.

The actuator 72 is fastened to both the actuator base support bracket 74 and the actuator head support bracket 76. The actuator 72 has a piston rod 70 that is clevis coupled to the plate bracket 68. The actuator 72 has a first fluid port 80 and a second fluid port 82. A first fluid hose 84 is connected to the first fluid port 80. A second fluid hose 86 is connect to the second fluid port 82. Details of these fluid connections will be discussed in further details below.

Referring still to FIGS. 3 and 4, a position sensor 104 is mounted to the vibratory conveyor bed 104 for sensing the relative position between the slide plate 64 and the aperture 62. The position sensor 104 has a position sensor rod 110 that extends longitudinally along and beneath the conveyor bed 104. A slide disk 114 is attached to the slide plate 64, and positioned in sliding relation over the position sensor rod 110. The position sensor 104 is fastened to the conveyor bed 34 by means of a position sensor mounting bracket 106 and a position sensor rod stabilizing bracket 112.

Figure 5:
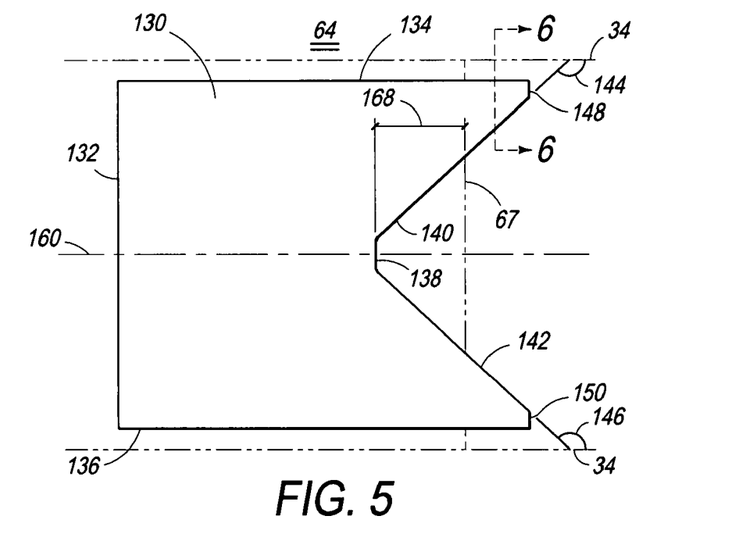
FIG. 5 is a plan view of one embodiment of the slide plate referenced to the conveyor bed and the longitudinal axis of the vibratory conveyor.

Referring now to FIG. 5, an embodiment of the slide plate 64 is positioned in relation to the conveyor bed 34 and centered about a conveyor bed longitudinal axis 160. In this embodiment, the slide plate 64 is symmetrical about the longitudinal axis 160. The slide plate 64 has a first edge 132 positioned in transverse relation to the conveyor bed 34. One end of the first edge 132 is connected to a second edge 134 which is oriented in a substantially parallel relation to the conveyor bed 34. An opposite end of the first edge 132 is connected to a third edge 136 which is oriented in parallel relation to the second edge 134. A fourth edge 138 is oriented in parallel relation to the first edge 132, and has a length that is less than a length of the first edge 132. A fifth edge 140 is connected to an end of the fourth edge 138 and is oriented at a first oblique angle 144 relative to the longitudinal axis 160 and the conveyor bed 34. A sixth edge 142 is connected to an opposite end of the fourth edge 138 and is oriented at a second oblique angle 146 relative to the longitudinal axis 160 and the conveyor bed 34. A seventh edge 148 is connected between an end of the second edge 134 and to an end of the fifth edge 140. An eighth edge 150 is connected between an end of the sixth edge 142 and an end of the third edge 136.

The fourth edge 138 of the slide plate 64 is movable relative to the effective aperture edge 67 and forms a distance value that is generally indicated by the numeral 168 which represents a distance relationship between the fourth edge 138 of the slide plate 64 and the effective aperture edge 67.

Figure 6:
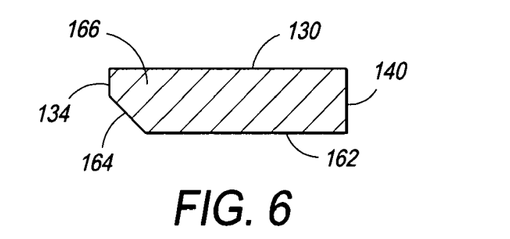
FIG. 6 is a cross sectional view of a portion of the slide plate.

Referring now to FIG. 6, the slide plate 64 is formed from a plate material 166, which in one embodiment, is UHMW.

The article contact surface 130 forms a conveying surface for articles as they travel the length of the slide plate 64. The fifth edge 140 is shown is substantially perpendicular to the article contact surface 130, and provides a discharge or drop-off surface for articles that have completed their journey across the surface of the slide plate 64. The second edge 134 connects to a slide bevel 164 formed along both the second edge 134 and the third edge 136. The slide bevel 164 has an angle that is selected to mate with a pair slide rails (not shown) that are mounted in parallel fashion to the conveyor bed 34. The combination of the slide bevel 164 on the slide plate 64 and the slide rails (not shown) provide support and facilitates movement of the slide plate relative to the aperture 62.

Figure 7:
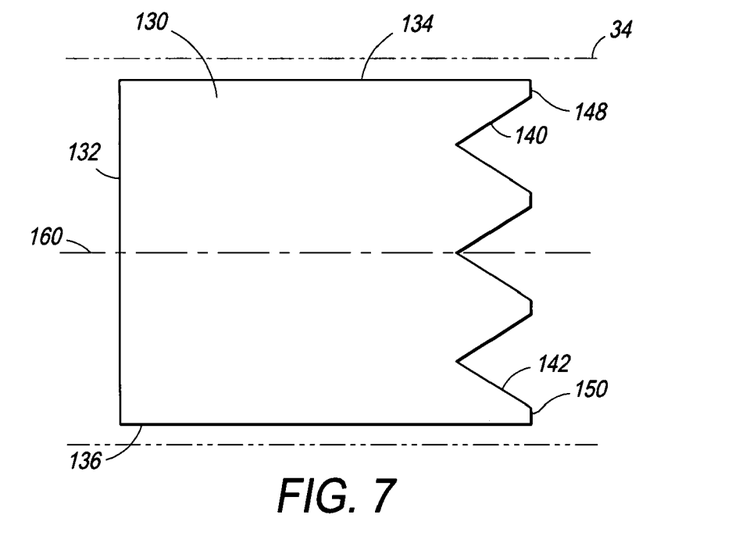
FIG. 7 is a plan view of an alternative embodiment of the slide plate referenced to the conveyor bed and the longitudinal axis of the vibratory conveyor.

Referring now to FIG. 7, another embodiment of the slide plate 64 is shown. Here, a plurality of fifth edges 140 and sixth edges 142 are joined in end-to-end relation to provide a distinct pattern of article distribution.

Figure 8:
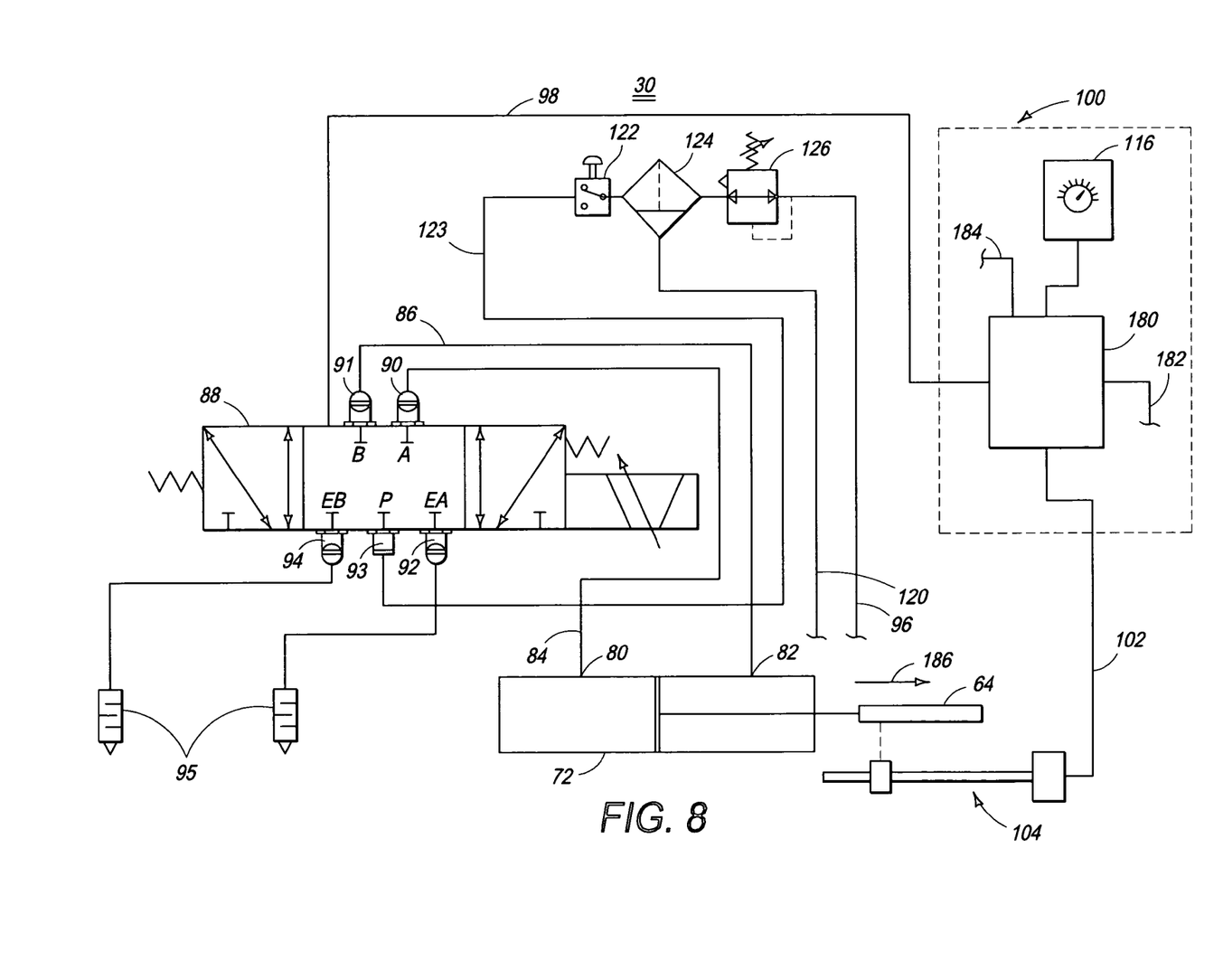
FIG. 8 is a schematic diagram of the metering gate assembly.

Referring now to FIG. 8, the metering gate assembly 30 includes the actuator 72 operatively connected to the slide plate 64. The position sensor 104 ascertains the position of the slide plate 64 relative to the actuator and creates a signal that is sent over the sensor signal cable 102. A position controller 180 receives the signal from the sensor signal cable 102. The position controller 180 receives the signal from the position signal cable 105. The position controller 180 receives electrical power through a supply power cable 184. A control potentiometer 116 is operable to provide a user specified set point which is sent by a manual set point signal cable 118 to the position controller 180. A control input signal cable 182 is also connected to the position controller 180 and is optionally operable to provide automatic set point control of the position of the slide plate 64 when desired by an operator. This control input signal cable 182 may be connected to process equipment (not shown) or a programmable logic controller. The position controller 180 provides a control signal that is delivered through a valve control cable 98 to a control valve 88. The control valve 88 is a four way, five port control valve. In one embodiment, the control valve 88 is a linear force motor valve specifically adapted for use with pneumatic fluid systems. One skilled in the art will recognize that there are other technologies which would be useful in this application including spool operated solenoid valve and servo valves without departing from the scope of this invention. The operation of the control valve 88 will be discussed in more detail below.

Still referring to FIG. 8, a fluid supply hose 96 is operatively attached to a fluid source from a pump or compressor (not shown) which provides a source of fluid to translate the actuator 72. The fluid supply hose 96 is connected to a pressure regulator 126 whose output is operatively connected to a filter 124. The filter 124 has a drain port that is connected to a drain hose 120. The filter 124 has an output port that is connected to a pressure switch 122. The pressure switch 122 has an output that is connected to a valve supply hose 123 which delivers a conditioned fluid supply to the control valve 88 through a fourth valve port 93. The control valve 88 includes a first valve port 90 that is connected to the first fluid hose 84 that is connected to the first fluid port 80 of the actuator 72. Fluid flowing from the control valve 88 through the first fluid port 80 of the actuator 72 will cause the slide plate 64 to translate in the direction of the arrow generally represented by the numeral 186. The control valve 88 includes a second valve port 91 that is connected to the second fluid hose 86 that is connected to the second fluid port 82 of the actuator 72. Fluid flowing from the control valve 88 through the second fluid port 82 of the actuator 72 will cause the slide plate 64 to translate in a direction that is opposite to the direction depicted by the arrow generally represented by the numeral 186. The control valve 88 includes a third valve port 92 that is operatively connected to a fluid exhaust filter 95. The control valve 88 includes a fifth valve port 94 that is operatively connected to another fluid exhaust filter 95. The control valve 88 is configured to block fluid flow from both the first valve port 90 and second valve port 91 to maintain a present position of the slide plate 64 relative to the aperture 62 and the effective aperture edge 67, and to the vibratory conveyor 12.

The fluid supply (not shown) in the embodiment in FIG. 8 is an air supply for use with a pneumatic system. One skilled in the art would recognize that other fluid power systems would be useful including hydraulic systems without departing from the scope of this invention.

Figure 9:
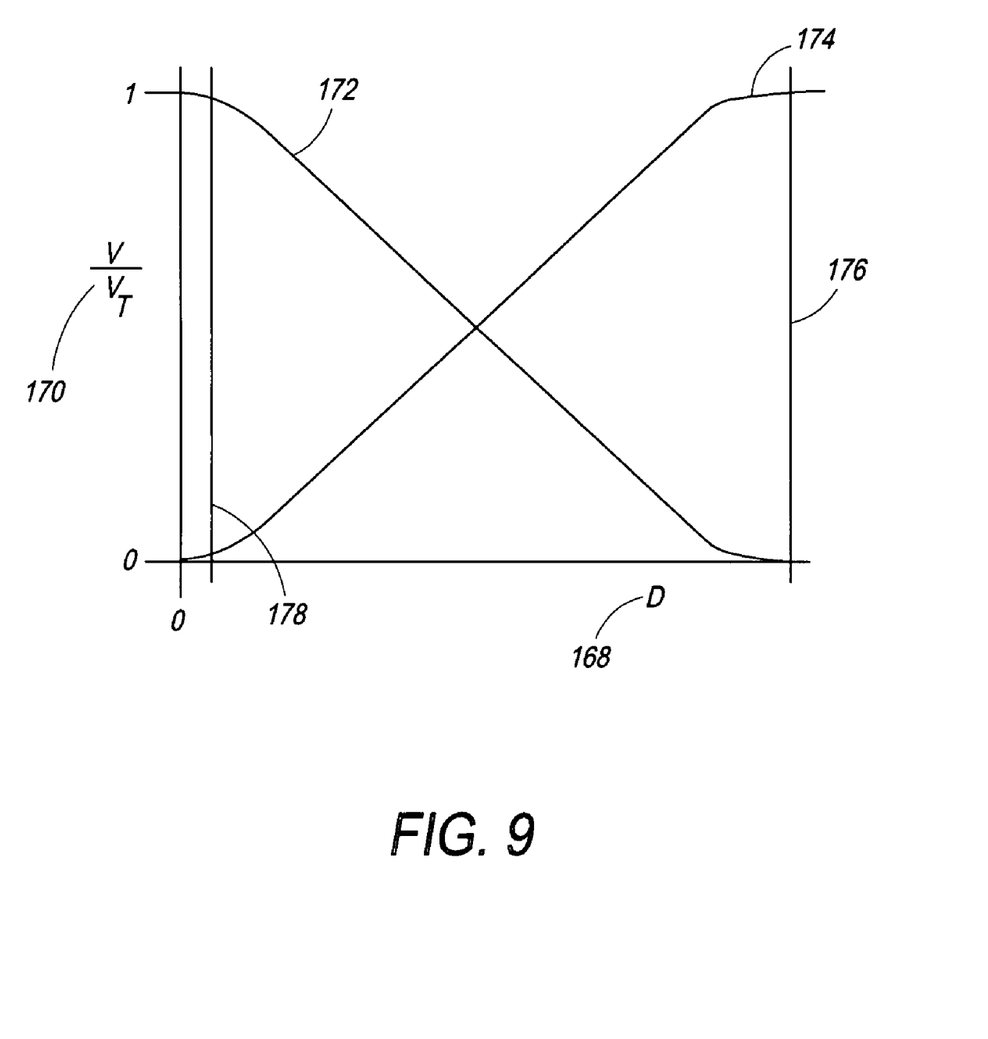
FIG. 9 is a two-dimensional chart of the relationship of the ratiometric article stream volume as a function of the position of the slide gate relative to the effective edge of the aperture.

Referring now to FIG. 9, a ratiometric volume 170 is represented on a vertical axis of the chart. The distance 168 as described above and whose definition can be best understood through a study of FIG. 5, is represented on a horizontal axis of the chart. The ratiometric volume 170 is calculated by dividing a numerator by a denominator. The numerator is equal to a value of a volumetric flow of articles in either the a) gate discharge stream, b) the cross stream 22 (FIG. 1), or c) the conveyor discharge stream or pass stream 20 (FIG. 1). The denominator is equal to a value representing a volumetric flow of the articles in the stream of articles 18 (FIG. 1).

A pass stream volumetric ratio relationship is generally represented by the curve 172. A cross stream volumetric ratio relationship is generally represented by the curve 174.

The line 178 represents the distance 168 when the metering gate assembly 30 is configured in a closed or blinding position. In this configuration, the slide plate 64 is held in an extended position, which effectively passes articles from the article stream 18 to the pass stream 20 so that the ratiometric volume of the pass stream as illustrated by the curve 172 is substantially equal to unity, and the pass steam volumetric ratio as represented by the curve 174 is substantially equal to zero.

The line 176 represents the distance 168 when the metering gate assembly 30 is configured in an open position. In this configuration, the slide plate 64 is held in a retracted position, which effectively transfers articles from the article stream 18 to the cross stream 20 so that the ratiometric volume of the cross stream as illustrated by the curve 174 is substantially equal to unity, and the pass steam volumetric ratio represented by the curve 172 is substantially equal to zero.

Operation

The operation of the present invention is believed to be readily apparent and is briefly summarized in the paragraphs which follow.

In operation, the vibratory distribution system 10 receives a stream of articles 18 that are conveyed and distributed by the vibratory conveyor 12 to the metering gate assembly 30. The metering gate assembly 30 includes the actuator 72 having the first and second fluid ports designated by the numerals 80 and 82 respectively. The actuator 72 is borne by the vibratory conveyor 12, and is operatively connected to the slide plate 64. The slide plate 64 is positioned in transmission relation to the stream of articles 18. The metering gate assembly 30 includes the control valve 88 that is operatively connected to a fluid source through the fluid supply hose 96, and to the first and second fluid ports 80 and 82 of the actuator 72. The slide plate 64 is moved or translated relative to the vibratory conveyor 12 by selectively activating the control valve 88 to permit a fluid flow from the fluid source to the first or second fluid port 80 and 82 of the actuator 72. The slide plate 64 is held or maintains its position relative to the vibratory conveyor 12 by causing the control valve 88 to halt a fluid flow from both the first and second ports 80 and 82 of the actuator 72.

The stream of articles 18 are introduced to the infeed of the vibratory conveyor 12. The vibratory conveyor 12 is driven by the vibratory drive 46. Articles in the stream of articles 18 travel in a direction generally indicated by the arrow 24, along the conveyor bed 34, and to the metering gate assembly 30. At the metering gate assembly 30, the articles are metered, proportioned, or diverted to either the downstream vibratory conveyor 14 or to the cross conveyor 16 depending on the position of the slide plate 64.

In one embodiment, the slide plate 64 of the metering gate assembly 30 is controlled or positioned by means of the control potentiometer 116. Here, a signal from the control potentiometer 116 is sent to the position controller 180. During this time, the position sensor 104 reports a current position of the slide plate 64 relative to the vibratory conveyor 12 to the position controller 180. The position controller 180 includes circuitry that digitizes the signals from the control potentiometer 116 and from the position sensor 104 and converts them into digital signals. The digital signals are routed to a microprocessor, that resides in the position controller 180, which follows program instructions that instructs the microprocessor to make a comparison between the digital signal representing the position provided by the position sensor 104 to the digital signal representing the user defined set point as indicated by the control potentiometer 116 to determine the type of action that is required to move or translate the slide plate 64 so that the position of the position sensor 104 approximately matches or equals the position selected using the control potentiometer 116. The type of action is specified by the microprocessor in the form of digital commands. These digital commands are conditioned by additional electronic circuitry in the position controller 180 to command or operate the control valve 88. In one embodiment, the control valve 88 is commanded or operated using pulse width modulation techniques which skillfully guide the state of the valve to precisely modulate the flow of fluid to and from the actuator 72.

For example, when the position sensor 104 returns a value that indicates that the slide plate 64 is in a more retracted position than the set point specified by the control potentiometer 116, then the position controller 180 will respond by modulating the control valve 88 in such a way that fluid will flow from the fluid supply hose 96 through the valve supply hose 123, and into the fourth valve port 93 of the control valve 88. Then, fluid entering the fourth valve port 93 will be ushered or routed to the first valve port 90 and travel through the first fluid hose 84 to the first fluid port 80 of the actuator 72. This influx of fluid into the actuator 72 will cause the piston rod to extend thus displacing fluid which will return through the second fluid port 82, and through the second fluid hose 86, and back through the second valve port 91, which will be routed through an exhaust port 94, and finally exhausted through the fluid exhaust filter 95. The resultant movement will be in the direction of the movement arrow 186, and will be measured by the position sensor 104. The position sensor 104 will send this signal through the position signal cable 102 to the position controller 180 where the entire process is repeated. Finally, when the position of the slide plate 64 as measured or sensed by the position sensor 104 substantially matches the user-specified set point as selected on the control potentiometer 116, then the controller 180 will command the control valve 88 to block fluid flow from flowing to or from the first fluid port 80 and the second fluid port 82 of the actuator 72. In this manner the position of the slide plate 64 relative to the vibrator conveyor 12 will be maintained despite the violent motion imparted to the slide plate 64 by the conveyor bed 34.

When the position sensor 104 returns a value that indicates that the slide plate 64 is in a more extended position than the set point specified by the control potentiometer 116, then the position controller 180 will respond by modulating the control valve 88 in such a way that fluid will flow from the fluid supply hose 96 through the valve supply hose 123, and into the fourth valve port 93 of the control valve 88. Then, fluid entering the fourth valve port 93 will be ushered or routed to the second valve port 91 and travel through the second fluid hose 86 to the second fluid port 82 of the actuator 72. This influx of fluid into the actuator 72 will cause the piston rod to retract, and thus displace fluid which will return through the first fluid port 80, and through the first fluid hose 84, and back through the first valve port 90, which will be routed through the exhaust port 94, and finally exhausted through the fluid exhaust filter 95. The resultant movement will be in a direction that is opposite the direction of the movement arrow 186, and will subsequently be measured or sensed by the position sensor 104. The position sensor 104 will send this signal through the position signal cable 102 to the position controller 180 where the entire process will be repeated. Finally, when the position of the slide plate 64 as measured or sensed by the position sensor 104 substantially matches the user-specified set point as selected on the control potentiometer 116, then the controller 180 will command the control valve 88 to block fluid flow from flowing to or from both the first fluid port 80 and the second fluid port 82 of the actuator 72. In this manner the position of the slide plate 64 relative to the vibrator conveyor 12 will be maintained despite the violent motion imparted to the slide plate 64 by the conveyor bed 34.

From the previous discussion, it should be understood that the set point matched by the controller 180 can come from a variety of sources beyond the control potentiometer 116. For example, an alternate set point is provided through the control input 182. This control input 182 signal may be provided by a separate programmable logic controller, or another piece of process equipment that is capable of supplying a meaningful control signal.

Articles traveling on the conveyor bed 34 will encounter the slide plate 64 of the metering gate assembly and will be transported in a general longitudinal manner over the length of the slide plate 64. The position of the slide plate 64 relative to the effective aperture edge 67 determines to a great extent which articles will fall from the slide plate 64 to the drop plate 66 to be subsequently transported by the downstream vibratory conveyor 14 or the cross conveyor 16. When the slide plate 64 is in a fully retracted position it can be observed from inspection of FIG. 1 that all of the articles will fall by the force of gravity to the cross conveyor 16. On the other hand, when the slide plate 64 is in its fully extended position then articles traveling on its length will fall onto the drop plate 66 or on the downstream vibratory conveyor 14. From the previous discussion it should be appreciated that the slide plate 64 may be positioned at any position between a fully extended and a fully retracted position and that the position can be maintained at that position for extended periods of time.

The slide plate 64 when positioned in a partially retracted position as shown in FIG. 1 will transport and deliver articles traveling near the longitudinal axis of the vibratory conveyor bed 34 to the cross conveyor 16 while articles traveling away from the longitudinal axis 160 of the conveyor bed 34 will be transported to the downstream vibratory conveyor 14. In this manner, the flow of articles has a symmetrical distribution by virtue of the shape of the slide plate 64. Thus, the shape of the slide plate 64 can be modified to customize the distribution by simply modifying the shape. Variations of shape are shown in both FIGS. 5 and 7. One skilled in the art would recognize that there are other slide plate 64 shapes that may be advantageous in certain situations and could be employed without departing from the scope of this invention.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claim in any of its forms or modifications within the proper scope of the appended claims appropriately interpreted in accordance with the doctrine of equivalents.

We claim:

1. A vibratory distribution system for receiving a stream of articles and conveying such articles for selectively metering and diverting articles from the stream, comprising:
   an elongated conveyor bed for receiving and conveying the articles;
   a vibratory drive operatively connected to the conveyor bed for vibrating the conveyor bed to convey the articles in the stream;
   a metering gate assembly configured to selectively meter and divert articles from the stream;
   and wherein the metering gate assembly comprises an aperture formed in the conveyor bed and positioned in receiving relation to the articles;
   and wherein the metering gate assembly comprises a slide plate positioned in contact and sliding relation to the conveyor bed and located proximate to the aperture;
   and wherein the metering gate assembly comprises an actuator positioned in force transmission relation to the slide plate, and having a piston rod, a first fluid port, and a second fluid port;
   and wherein the metering gate assembly comprises a control valve connected in fluid communication with the first and second fluid ports of the actuator;
   and wherein the control valve is configured to direct a flow of fluid to either the first or second port of the actuator to translate the piston rod of the actuator, and is further configured to block a flow of fluid from both the first and second ports of the actuator to maintain a position of the piston rod of the actuator.

2. The vibratory distribution system as claimed in claim 1, and wherein the actuator is borne by the conveyor bed.

3. The vibratory distribution system as claimed in claim 2, and wherein the metering gate assembly comprises:
   a sensor configured to provide a position signal indicative of the relative position of the slide plate to the aperture; and
   a control system responsive to a user specified set point and configured to compare the user specified set point with the signal from the sensor and configured to provide a control signal to the control valve to cause the piston rod of the actuator to translate the slide plate to a position that is substantially equal to the user specified set point.

4. The vibratory distribution system as claimed in claim 3, and wherein the actuator is a double acting pneumatic cylinder.

5. The vibratory distribution system as claimed in claim 4, and wherein the control valve is a five port, four way spool valve.

6. The vibratory distribution system as claimed in claim 5, and wherein the slide plate has a shape, and wherein the shape of the slide plate is non-rectangular.

7. The vibratory distribution system as claimed in claim 5, and wherein the slide plate has a shape, and wherein the shape of the slide plate is symmetrical about a longitudinal axis of the conveyor bed.

8. A vibratory distribution system for receiving a stream of articles and conveying such articles for selectively metering and diverting articles from the stream, comprising:
   an elongated conveyor bed for receiving and conveying the articles;
   a vibratory drive operatively connected to the conveyor bed for vibrating the conveyor bed to convey the articles in the stream;
   a metering gate assembly configured to selectively meter and divert articles from the stream;
   and wherein the metering gate assembly comprises an aperture formed in the conveyor bed and positioned in receiving relation to the articles;
   and wherein the metering gate assembly comprises a slide plate positioned in contact and sliding relation to the conveyor bed and located proximate to the aperture;
   and wherein the metering gate assembly comprises an actuator borne by the conveyor bed and positioned in force transmission relation to the slide plate;
   and wherein the metering gate assembly comprises a position sensor configured to provide a position signal indicative of the relative position of the slide plate to the aperture;
   and wherein the metering gate assembly comprises a control system responsive to a user specified set point and configured to compare the user specified set point with the signal from the position sensor and configured to modulate the actuator to translate the slide plate to a position that is substantially equal to a position substantially equal to the user specified set point.

9. The vibratory distribution system as claimed in claim 8, and wherein the actuator comprises a piston rod, and is a double acting fluid cylinder having first and second fluid ports.

10. The vibratory distribution system as claimed in claim 9, further comprising:
    a control valve configured to modulate the actuator, and wherein the control valve is configured to direct a flow of fluid to either the first or second fluid port of the actuator to translate the piston rod of the actuator, and is further configured to block a flow of fluid from both the first and second fluid ports of the actuator to maintain a position of the piston rod of the actuator.

11. The vibratory distribution system as claimed in claim 10, and wherein the slide plate has a shape and wherein the shape is non-rectangular.

12. The vibratory distribution system as claimed in claim 11, and wherein the shape of the slide plate comprises:
    a first edge having a length that is oriented in a transverse direction relative to the conveyor bed and having a length;
    a second edge oriented in a longitudinal direction relative to the conveyor bed and connected to an end of the first edge;
    a third edge oriented in a parallel direction relative to the second edge and connected to an opposite end of the first edge;
    a fifth edge oriented at a first oblique angle relative to the conveyor bed; and a sixth edge oriented at a second oblique angle relative to the conveyor bed.

13. The vibratory distribution system as claimed in claim 12, and wherein the slide plate has a fourth edge having a length and positioned at an intermediate position, and having an end that is connected to the fourth edge and having an opposite end that is connected to the fifth edge, and positioned between the second and third edges, and in parallel relation to the first edge and wherein the length is substantially less than the length of the first edge.

14. The vibratory distribution system as claimed in claim 11, and wherein the slide plate has a shape, and wherein the shape of the slide plate is symmetrical about a longitudinal axis of the conveyor bed.

15. A vibratory distribution system for receiving a stream of articles and conveying such articles for selectively metering and diverting articles from the stream, comprising:
   an elongated conveyor bed for receiving and conveying the articles;
   a vibratory drive operatively connected to the conveyor bed for vibrating the conveyor bed to convey the articles in the stream;
   a metering gate assembly configured to selectively meter and divert articles from the stream;
   wherein the metering gate assembly comprises an aperture formed in the conveyor bed and positioned in receiving relation to the articles;
   and wherein the metering gate assembly comprises a slide plate positioned in contact and sliding relation to the conveyor bed and located proximate to the aperture, and having a non-rectangular planar shape
   and wherein the metering gate assembly comprises an actuator borne by the conveyor bed and positioned in force transmission relation to the slide plate and operable to position the slide plate at a plurality of specific points through a substantially continuous distance, and wherein the continuous distance includes two end positions such that in a first end position the slide plate is positioned in article blocking relation relative to the aperture, and in a second end position the slide plate is positioned in article transmission relative to the aperture, and wherein the slide plate is selectively positionable at any one of the plurality of specific points to selectively to divert a ratiometric volume of articles from the stream of articles, and wherein the ratiometric volume is an approximate function of the position of the slide plate relative to the vibratory conveyor.

16. The vibratory distribution system as claimed in claim 15, and wherein the actuator has a piston rod, a first fluid port, and a second fluid port;
   and wherein the metering gate assembly further comprises a control valve connected in fluid communication with the first and second fluid ports of the actuator;
   and wherein the control valve is configured to direct a flow of fluid to either the first or second port of the actuator to translate the piston rod of the actuator, and is further configured to block a flow of fluid from both the first and second ports of the actuator to maintain a position of the piston rod of the actuator.

17. The vibratory distribution system as claimed in claim 16, and wherein the slide plate has a shape, and wherein the shape of the slide plate is symmetrical about a longitudinal axis of the conveyor bed.

18. The vibratory distribution system as claimed in claim 16, and wherein the shape of the slide plate comprises:
   a first edge having a length that is oriented in a transverse direction relative to the conveyor bed and having a length;
   a second edge oriented in a longitudinal direction relative to the conveyor bed and connected to an end of the first edge;
   a third edge oriented in a parallel direction relative to the second edge and connected to an opposite end of the first edge;
   a fourth edge having a length and positioned at an intermediate position between the second and third edges and in parallel relation to the first edge and wherein the length is substantially less than the length of the first edge;
   a fifth edge connected to an end of the fourth edge, and oriented at a first oblique angle relative to the conveyor bed; and
   a sixth edge positioned between an end of the third edge and an opposite end of the fourth edge, and oriented at a second oblique angle relative to the conveyor bed.

19. A method of conveying and distributing a stream of articles in a vibratory conveyor for selectively metering and diverting articles from the stream, comprising:
   providing a metering gate assembly comprising an actuator borne by the vibratory conveyor, and having first and second fluid ports, and further comprising a slide plate operatively connected to the actuator and positioned in transmission relation to the stream of articles;
   providing a control valve operatively connected to a fluid source and connected to the first and second fluid ports of the actuator; and
   translating the slide plate relative to the vibratory conveyor by selectively activating the control valve to permit a fluid flow from the fluid source to the first or second fluid ports of the actuator, and holding the slide plate relative to the vibratory conveyor by causing the control valve to halt a fluid flow from both the first and second fluid ports of the actuator.

\* \* \* \* \*